(12) United States Patent
Lee et al.

(10) Patent No.: US 10,703,875 B2
(45) Date of Patent: Jul. 7, 2020

(54) SOLVENT RECOVERY APPARATUS AND SOLVENT RECOVERY METHOD

(71) Applicant: LG Chem, Ltd., Seoul (KR)

(72) Inventors: Sung Kyu Lee, Daejeon (KR); Joon Ho Shin, Daejeon (KR)

(73) Assignee: LG Chem, Ltd. (KR)

( * ) Notice: Subject to any disclaimer, the term of this patent is extended or adjusted under 35 U.S.C. 154(b) by 92 days.

(21) Appl. No.: 15/779,304

(22) PCT Filed: Jun. 12, 2017

(86) PCT No.: PCT/KR2017/006056
§ 371 (c)(1),
(2) Date: May 25, 2018

(87) PCT Pub. No.: WO2017/217708
PCT Pub. Date: Dec. 21, 2017

(65) Prior Publication Data
US 2018/0319949 A1  Nov. 8, 2018

(30) Foreign Application Priority Data

Jun. 16, 2016 (KR) .................. 10-2016-0074837

(51) Int. Cl.
*C08J 11/02* (2006.01)
*B01D 3/38* (2006.01)
(Continued)

(52) U.S. Cl.
CPC .............. *C08J 11/02* (2013.01); *B01D 3/007* (2013.01); *B01D 3/009* (2013.01); *B01D 3/143* (2013.01); *B01D 3/322* (2013.01); *B01D 3/346* (2013.01); *B01D 3/38* (2013.01); *B01D 3/4205* (2013.01); *B01D 5/006* (2013.01); *B01D 5/0039* (2013.01); *B01D 5/0063* (2013.01);
(Continued)

(58) Field of Classification Search
None
See application file for complete search history.

(56) References Cited

U.S. PATENT DOCUMENTS 4,406,750 A    9/1983  Irvin
2005/0267288 A1  12/2005  Yamaguchi et al.
(Continued)

FOREIGN PATENT DOCUMENTS

KR    20040042561 A    5/2004
KR    10-0811971 B1    3/2008
(Continued)

OTHER PUBLICATIONS

Siemens, Production of Synthetic Rubber (2003), https://seimens.com/processanalytics (Year: 2003).*
Extended European Search Report including Written Opinion for EP17813532.3 dated Mar. 20, 2019.
International Search Report From PCT/KR2017/006056 dated Sep. 11, 2017.

*Primary Examiner* — Derek N Mueller
(74) *Attorney, Agent, or Firm* — Lerner, David, Littenberg, Krumholz & Mentlik, LLP

(57) ABSTRACT

The present invention relates to a solvent recovery apparatus and a solvent recovery method, and the solvent recovery apparatus and method according to the present application can reduce the used amount of steam in a synthetic rubber production process, and can reduce the used amount of energy by recovering the waste heat discarded through a condenser.

14 Claims, 3 Drawing Sheets

(51) Int. Cl.
*C08F 6/10* (2006.01)
*B01D 3/34* (2006.01)
*B01D 5/00* (2006.01)
*B01D 3/00* (2006.01)
*C08F 6/06* (2006.01)
*C08J 11/14* (2006.01)
*B01D 3/42* (2006.01)
*C08J 11/04* (2006.01)
*B01D 3/14* (2006.01)
*B01D 3/32* (2006.01)

(52) U.S. Cl.
CPC .............. *B01D 5/0075* (2013.01); *C08F 6/06* (2013.01); *C08F 6/10* (2013.01); *C08J 11/04* (2013.01); *C08J 11/14* (2013.01)

(56) References Cited

U.S. PATENT DOCUMENTS

| | | |
|---|---|---|
| 2009/0057128 A1 | 3/2009 | Vane et al. |
| 2010/0101273 A1 | 4/2010 | Sechrist et al. |
| 2015/0299075 A1 | 10/2015 | Lee et al. |

FOREIGN PATENT DOCUMENTS

| | | |
|---|---|---|
| KR | 20140092783 A | 7/2014 |
| KR | 20160051665 A | 5/2016 |
| WO | 2004007567 A1 | 1/2004 |
| WO | 2009032143 A1 | 3/2009 |

\* cited by examiner

[Figure 1]      PRIOR ART
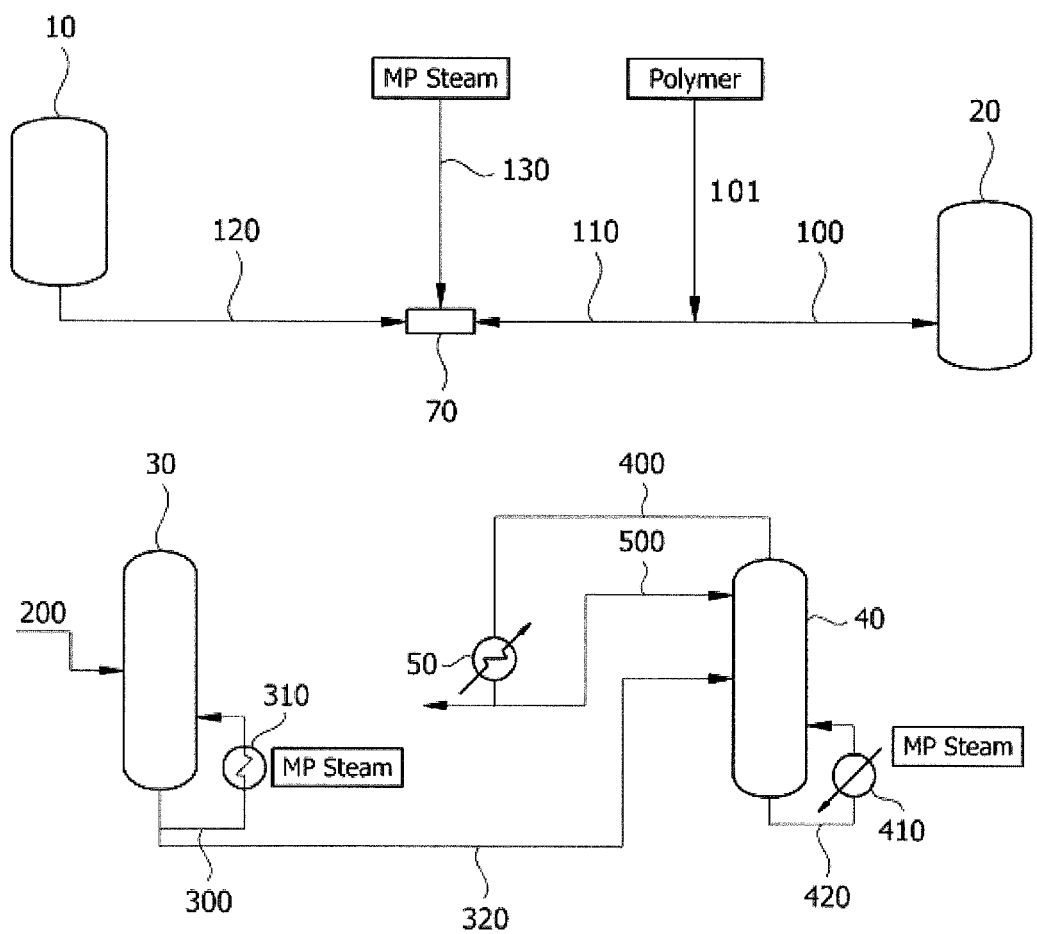

[Figure 2]
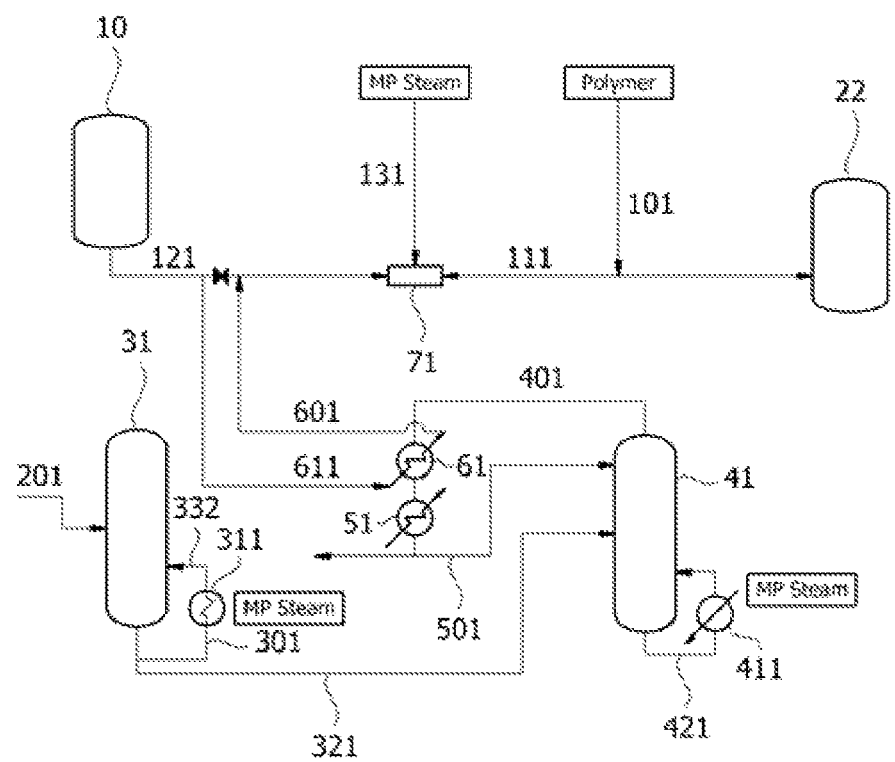

[Figure 3]
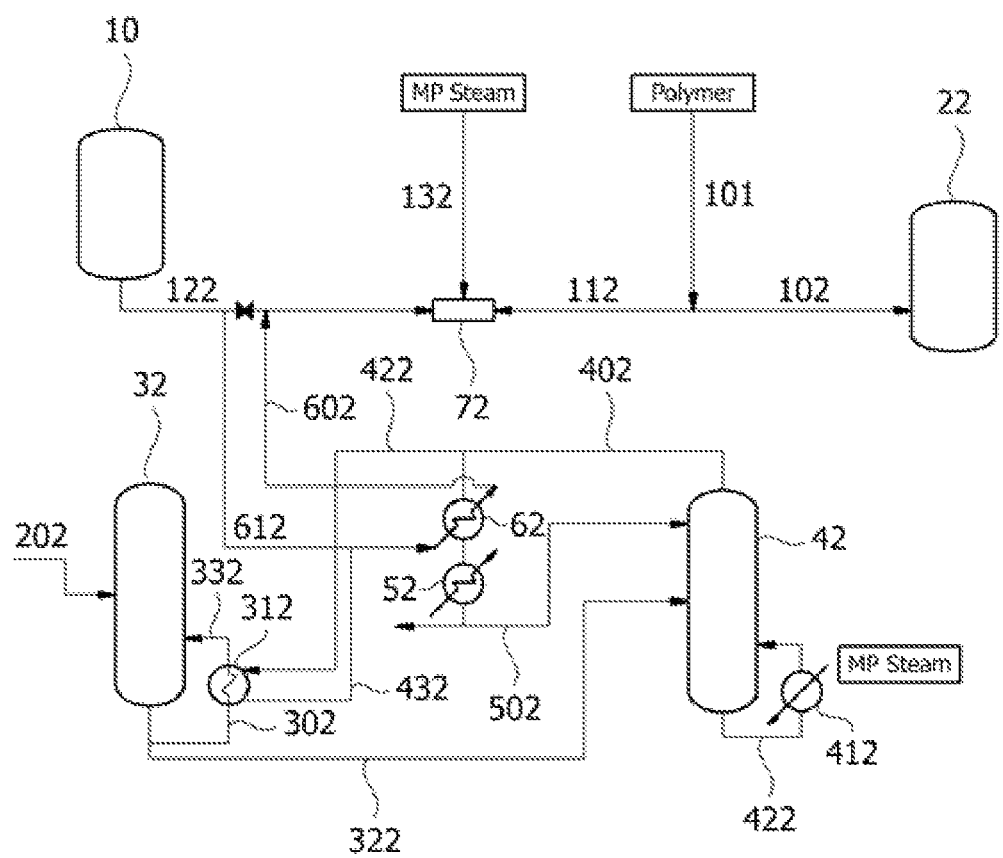

SOLVENT RECOVERY APPARATUS AND SOLVENT RECOVERY METHOD

CROSS REFERENCE TO RELATED APPLICATIONS

This application is a national phase entry under 35 U.S.C. § 371 of International Application No. PCT/KR2017/006056, filed Jun. 12, 2017, which claims priority to Korean Patent Application No. 10-2016-0074837, filed Jun. 16, 2016, the disclosures of which are incorporated herein by reference.

TECHNICAL FIELD

The present application relates to a solvent recovery apparatus and a solvent recovery method in a synthetic rubber production process.

BACKGROUND ART

Rubber is one of the most useful materials today and has elastic characteristics. However, natural rubber produced from rubber trees has limited production, whereby synthetic rubber for replacing the same has been used in various fields. The synthetic rubber refers to a polymer material having the same or similar physical properties as natural rubber. The synthetic rubber includes butadiene rubber, styrene-butadiene rubber, acrylonitrile butadiene rubber or butyl rubber, and the like.

In producing the synthetic rubber, methods such as suspension polymerization, emulsion polymerization, bulk polymerization and solution polymerization are used. However, polymerization methods for producing the synthetic rubber have each the following problems.

For example, when it is produced by bulk polymerization, the viscosity of the reactant rises sharply to cause a mechanical load increase, as the reaction progresses and upon further polymerization, it is difficult to control the reaction temperature, so that there is a disadvantage that commercial mass production is difficult.

Furthermore, in the case of suspension polymerization, an initiator (catalyst) is dissolved in a monomer, the monomer is dispersed in water, and then a dispersant is incorporated to stabilize the formed suspension. In all the suspension polymerization methods, a surfactant, which disperses the monomer particles such that the polymer does not fuse and aggregate upon reaction, is used and various dispersants such as water insoluble fine inorganic materials and organic materials are used depending on the monomers to be polymerized, so that there is a disadvantage that purity of the final product is lowered.

Therefore, in order to mass-produce synthetic rubber, the solution polymerization method or the emulsion polymerization method using a continuous polymerization reactor is mainly used.

For recovery and reuse of unreacted monomers and solvents after the reaction, a method such as steam stripping and distillation is used. An explanation of steam stripping to recover solvents in this way is well described in Korean Laid-Open Patent Publication No. 2004-0042561. Generally, there are various methods for recovering the polymer produced after a synthetic rubber production reaction, but as a typical method, a stripping process, in which the polymer solution is introduced into a high-temperature water and the solvent is volatilized and removed together with water vapor using steam to recover the polymer, is used.

DISCLOSURE

Technical Problem

The present application is intended to provide a solvent recovery apparatus and a solvent recovery method.

The attached FIG. 1 is a schematic diagram illustrating a solvent recovery process performed upon general synthetic rubber production. As shown in FIG. 1, typically, in a conventional synthetic rubber production process, water and steam supplied from a water supply source (10) are mixed with a mixture of a polymerized polymer and a solvent and supplied to a stripping unit (20). The solvent recovered in the stripping unit (20) is condensed and supplied to a distillation column (30) through a solvent inflow line (200). The solvent purified in a first distillation column (30) and a second distillation column (40) is recovered.

In the above method, steam is used for transferring the mixture of the polymer and the solvent, and steam is supplied in order to separate the solvent and the polymer in the stripping unit. In addition, the first distillation column (30) and the second distillation column (40) use a middle pressure steam (MP) as a heat source, where a large amount of energy is consumed in this process.

Therefore, in order to reduce the energy consumed in the solution polymerization process of the synthetic rubber, there is a need for a method capable of recovering and using waste heat.

Technical Solution

The present application relates to a solvent recovery apparatus and a solvent recovery method. According to an exemplary solvent recovery apparatus of the present application and a solvent recovery method using the solvent recovery apparatus, waste heat of oil mist discharged from an upper condenser of a distillation column for purifying a solvent used in the reaction in the production process of the synthetic rubber, is recovered to heat water supplied to a stripping unit or to use for a reboiler of the distillation column by using this heat, whereby the energy may be saved by recovering the discarded waste heat.

In this specification, the term 'and/or' is used as a meaning to include at least one or more of components listed before and after.

The terms, such as "first," "second," "third," "one side," and "other side," herein are used to distinguish one component from other components, where each component is not limited by the terms. Hereinafter, in explaining the present application, detailed descriptions of known general functions or configurations related thereto are omitted.

Hereinafter, the solvent recovery apparatus and the solvent recovery method of the present application will be described in detail.

The solvent recovery apparatus and the solvent recovery method of the present application can recover a solvent separated in the stripping unit after the reaction in the synthetic rubber production process, and then heat water for supplying into a stripping unit by heat exchange with an upper effluent stream in a process of purifying and reusing the solvent and supply the water into the stripping unit. In this specification, "stripping" means separation and removal of gas dissolved in liquid, which may be performed by, for example, direct contact with steam, inert gas or air, and the like, and a method such as heating and pressing, and the stripping herein can be used as the same sense as stripping, dissipating or separating.

In this specification, the term "piping system" may mean a structure that includes pipes or lines connecting devices, where "lines" may be substantially the same sense as pipes, the "stream" may mean movement of a fluid through a line or a pipe, and the line, pipe, and stream herein may share the same reference numeral.

The synthetic rubber production process of the present application comprises a process of producing butadiene rubber (BR), styrene-butadiene rubber (SBR), solution styrene-butadiene rubber (SSBR), and the like. The butadiene rubber (BR), styrene-butadiene rubber (SBR), solution styrene-butadiene rubber (SSBR), and the like can be produced by continuous polymerization with a method of solution polymerization or emulsion polymerization.

When the synthetic rubber is produced using the solution polymerization, a viscous material solution, which is a mixture of the polymer and the solvent after the polymerization reaction, is separated to the solvent and the polymer by stripping with steam. Also, when the synthetic rubber is produced using emulsion polymerization, the polymer produced after the polymerization reaction and the unreacted monomer and the solvent are separated by stripping after degassing, respectively.

As such, the waste heat is recovered from the upper condenser of the distillation column used in purifying a solvent to heat the water for supplying into the stripping unit used in the process of producing butadiene rubber (BR), styrene-butadiene rubber (SBR), solution styrene-butadiene rubber (SSBR), and the like by a method of solution polymerization or emulsion polymerization, whereby the used amount of steam can be reduced. In addition, the waste heat is recovered from the upper condenser of the distillation column and supplied to the reboiler of the distillation column, whereby the used amount of steam can be reduced.

Hereinafter, the present application will be described in detail with reference to the accompanying drawings.

The accompanying drawings illustrate exemplary embodiments of the present application, which are only provided to assist in understanding the present application, whereby the technical scope of the present application is not limited.

FIG. 2 is a diagram schematically showing a solvent recovery apparatus according to an exemplary embodiment of the present application. Referring to FIG. 2, the solvent recovery apparatus according to the present application comprises a solvent separation part, a purification part and a piping system.

For example, the solvent separation part may comprise a water supply tank (10), a stripping unit (22), and a pipe connecting the water supply tank (10) and the stripping unit (22). The pipe may comprise a water supply line (121) to which water is supplied, a steam supply line (131), and a polymer inflow line (101) into which a polymer and a solvent are introduced.

The "stripping unit" is a device capable of separating multi-component materials contained in raw materials by each boiling point difference, or a stripping unit for separating gas in the raw material and materials to be separated from raw materials. As the stripping unit (22), a stripping unit having various forms can be used in the present application in consideration of boiling points or the like of components of a raw material to be introduced or components to be separated, and the like.

An exemplary stripping unit of the present application can separate a solvent and a polymer by introducing a polymer solution into hot water and volatilizing a solvent together with water vapor using steam. The stripping unit may be configured such that the polymer solution containing the solvent to be recovered and the stream of the steam providing heat required upon recovering flow in opposite directions (counter current) to each other. In the process of recovering the polymer by stripping, the stripping unit can be filled therein with water in order to maintain a constant S/C (slurry content, mass of the rubber-like polymer in the stripping unit/total mass of the contents excluding the solvent in the stripping unit).

In one example, as the stripping unit or a stripping unit that can be used as a stripper, for example, a distillation column or device having general structure can be used, and preferably, a stripping unit in a form that two stripping units are connected to each other can be used.

In one example, the stripping unit (22) may comprise a feedstock supply part to which a raw material is supplied, a first outflow part for discharging a lower product of the stripping unit (22), and a second outflow part for discharging an upper product of the stripping unit (22).

The first outflow part may be located at the lower part of the stripping unit (22) and/or the bottom of the stripping unit, and the second outflow part may be located at the upper part of the stripping unit (22) and/or the top of the stripping unit. In this specification, the "upper part" may mean a relatively upper portion within the stripping unit, and more specifically, when the stripping unit is vertically bisected in a longitudinal direction, for example, in a length or height direction of the stripping unit, it may mean the upper part of two divided regions. Here, the "lower part" may also mean a relatively lower portion within the stripping unit, and more specifically, when the stripping unit is vertically bisected in a longitudinal direction, for example, in a length or height direction of the stripping unit, it may mean the lower part of two divided regions. In addition, the "top" of the stripping unit may mean the topmost portion of the stripping unit and may be located at the above-described upper part of the stripping unit, and the "bottom" of the stripping unit may mean the bottommost portion of the stripping unit and may be located at the above-described lower part of the stripping unit. In one example, there may be the middle part region between the upper part and the lower part of the stripping unit, and the upper part, middle part and lower part regions of the stripping unit may be used herein as relative concepts to each other. For example, when the stripping unit is bisected in the longitudinal direction, the stripping unit can be divided into upper part and lower part regions, and in this case, the stripping can occur in the upper part region and the lower part region. In addition, when the stripping unit is trisected in the longitudinal direction, the stripping unit can be divided into the upper part, the middle part and the lower part, and in this case, the stripping can occur in all the upper part, middle part and lower part regions or may also occur only in the middle part region.

In one example, the purification part may comprise distillation columns (31, 41) for distilling a mixture of solvent and water flowing from a solvent inflow line (201) into which a mixture of solvent and water discharged from the stripping unit (22) is introduced, and a condenser (51) for condensing a top stream (401) discharged from the top region of the distillation columns (31, 41) and refluxing a part thereof to the distillation columns (31, 41).

The "distillation column" can be selected from distillation columns used in a distillation process of general industrial fields. At this time, operating conditions of each of the distillation columns, such as the number and diameter, the pressure and temperature, and the reflux ratio of the upper and lower effluents, of each distillation column, and the like are not particularly limited, and they are preferable as long as the separation process can be continuously performed in a stabilized state. Furthermore, a condenser and/or a heat exchanger (or a reboiler) may be installed in each of the distillation columns. Depending on each of the distillation columns, the condenser and/or the heat exchanger may be optionally installed or may not be installed. In addition, the condenser and the heat exchanger may be components which may be omitted, even if they are shown in the drawings, unless otherwise specified.

The "top" of the distillation columns (31, 41) means the topmost portion of the columns of the distillation columns (31, 41) and may be included in the above-described upper part region of the distillation columns (31, 32), and the "bottom" of the distillation columns (31, 41) means the bottommost portion of the columns of the distillation columns (31, 41) and may be included in the above-described lower part region of the distillation columns (31, 41).

The "condenser" is a device installed separately from the distillation column, which may mean a device for cooling a material discharged from the distillation column by a method such as contacting it with the cooling water introduced from the outside. For example, the condenser (51) may be a device for condensing the top stream (401) discharged from the top region of the distillation columns (31, 41). Also, the "reboiler" is a heating device installed outside the distillation column, which may mean a device for heating and evaporating a stream having a high boiling point again. For example, the reboiler (411) of the distillation apparatus may be a device for heating the bottom stream discharged from the bottom region of the distillation columns (31, 41).

The solvent separation part and the purification part may be connected through the heat exchanger. For example, the water supply line (121) may be connected to the heat exchanger (61) through the water inflow line (611), the heat exchanger (61) may be connected to the water supply line (121) through the water outflow line (601), and the top stream (401) discharged from the top of the distillation column (41) may flow into the heat exchanger (61), pass through the heat exchanger (61) and flow into the distillation columns (31, 41) through a reflux line (501).

The "heat exchanger" is a device which is installed separately outside the distillation column and performs heat exchange such that heat transfer between two fluid streams having different temperatures from each other occurs smoothly, and for example, the heat exchanger (61) may be a device for heat-exchanging the top stream (401) discharged from the top region of the distillation column (41) and the water influent stream (611). In the solvent recovery apparatus of the present application, the top stream (401) discharged from the top region of the distillation column (41) and the water influent stream (611) are heat-exchanged in the heat exchanger (61) to each other and supplied into the polymer inflow line (101) through the water outflow line (601), whereby the energy required to transfer the mixture of the polymer and the solvent and the used amount of steam supplied to the stripping unit (22) can be reduced.

In one example, the purification part may comprise a first distillation column (31) and a second distillation column (41). The distillation part of the present application comprises a first distillation column (31) for distilling a mixture of a solvent and water introduced into a solvent inflow line (201), a first reboiler (311) for heating a first bottom stream (301) discharged from the bottom region of the first distillation column (31) and refluxing a part thereof to the first distillation column (31), and a first outflow line (321) for transferring a material flowing out to the lower part of the first distillation column (31). In addition, the purification part may comprise a second distillation column (41) for distilling a material introduced through the first outflow line (321), a second reboiler (411) for heating a second bottom stream (421) discharged from the bottom region of the second distillation column (41) and introducing a part thereof into the second distillation column (41), a condenser (51) for condensing the top stream (401) discharged from the top of the second distillation column (41) and refluxing a part thereof to the first distillation column (31) or the second distillation column (41) and a heat exchanger (61) for heat-exchanging a part of the top stream (401) and the water influent stream (611) flowing from the stripping part.

In one example, the piping system according to the present application may comprise: a first line formed so that water from the water supply tank can be mixed with the mixture and then introduced into the stripping unit; a second line formed so that the solvent recovered from the solvent separation part can be introduced into the first distillation column; and a third line formed so that the solvent purified in the first distillation column can be introduced into the second distillation column. The first line may comprise a water supply line (121), a steam supply line (131), and a polymer inflow line (101). For example, the water supply line (121) supplied from the water supply tank (10) may be connected with the steam supply line (131), the polymer inflow line (101), and the stripping unit (22) one another via pipes. Preferably, they may be fluidically connected so that the water supplied from the water supply line (10) and the steam supply line (131) can be mixed in a steam mixer (71), mixed with the mixture of the polymer and the solvent, and then introduced into the stripping unit (22) through the polymer inflow line (101). The second line may comprise a solvent inflow line (201) for introducing a mixture of a solvent and water discharged from the stripping unit (22), and the third line may comprise a first outflow line (321) for introducing a solvent discharged from the first distillation column to a second distillation column.

The piping system may comprise a first heat exchange line. For example, the first heat exchange line may comprise a water supply line (121), a water inflow line (611), a water outflow line (601), a heat exchanger (61) and a condenser (51). The water supply line (121) may be connected with the heat exchanger (61) through the water inflow line (611) and the heat exchanger (61) may be connected with the water supply line (121) through the water outflow line (601). The top line (401) discharged from the top of the distillation column (41) may flow into the heat exchanger (61), pass through the heat exchanger (61) and then be connected with the condenser (51) and connected with the distillation columns (31, 41) through the reflux line (501).

FIG. 3 is a diagram illustratively showing a solvent purification apparatus by another embodiment of the present application.

As shown in FIG. 3, the solvent recovery apparatus according to an embodiment of the present application may heat-exchange a first bottom stream (302) discharged from the bottom region of the first distillation column (32) and at least a part (442) of a second top stream (402) discharged from the top region of the second distillation column (42) in a first reboiler (312). The first bottom stream (302) is heated in the first reboiler using a part (442) of the top stream (402)

and supplied into the first distillation column (32), whereby the energy to be used to heat the bottom stream can be reduced.

In one example, the top stream (402) discharged from the top region of the second distillation column (42) heat-exchanged with the first bottom stream (302) discharged from the bottom region of the first distillation column (32) in the first reboiler (312) may be supplied between the condenser (52) and the heat exchanger (62).

The details of the stripping unit and the condenser are the same as those described above, and thus are omitted.

In the above example, the piping system may comprise a second heat exchange line. For example, the second heat exchange line may comprise a first reboiler (312) and a condenser (52) of the first distillation column. The second heat exchange line may introduce a part (442) of the top stream (402) of the second distillation column (42) into the reboiler (312) of the first distillation column (32), may be heat-exchanged in the reboiler (312) of the first distillation column, and then refluxed to the first distillation column (32) or the second distillation column (42) through the condenser (52).

The present application also relates to a solvent recovery method. The solvent recovery method may be performed by the above-described solvent recovery apparatus. The exemplary method may comprise a solvent recovery step comprising a process of mixing a mixture comprising a polymer component and a solvent with water from a water supply tank and then introducing the mixture into a stripping unit; and a solvent purification step of purifying the solvent recovered in the solvent recovery step in the first and second distillation columns, but may comprise a step of heat-exchanging the top product of the second distillation column with water before being mixed with the mixture or the reboiler of the first distillation column through the piping system.

The solvent recovery method according to one embodiment of the present application may comprise steps of: introducing the water supply stream (121) and the steam supply stream (131) into a steam mixer (71) and mixing them, supplying the steam discharged from the steam mixer (71) to the polymer inflow line (101) and introducing it into the stripping unit (22), introducing the solvent separated in the stripping unit (22) into the first distillation column (31) through the solvent inflow line (201) and distilling it, heating a part of the first bottom stream (301) discharged from the bottom region of the distillation column (31) by the first reboiler (311) and refluxing it to the first distillation column (31), introducing a part of the bottom stream of the distillation column (31) into the second distillation column (41) and distilling it, heating the bottom stream discharged from the bottom region of the second distillation column (41) by the second reboiler (411) and refluxing a part thereof to the second distillation column (41), condensing the top stream discharged from the top region of the second distillation column (41) and refluxing a part thereof, and heat-exchanging the top stream (401) discharged from the top region of the second distillation column and at least a part of the water supply stream (121) in the heat exchanger (61).

In one example, a difference (Ti−Ta) between the temperature (Ti) of the top product before heat exchange with water or the reboiler and the temperature (Ta) of the effluent stream of water or the reboiler after heat exchange with the top product can be controlled so as to satisfy Equation 1 below.

$|Ti-Ta| \leq 60°$ C.  [Equation 1]

In the solvent recovery method, by controlling the difference (Ti−Ta) between the temperature (Ti) of the top product before heat exchange with water or the reboiler and the temperature (Ta) of the effluent stream of water or the reboiler after heat exchange with the top product in the above range, the amount of cooling water used in the condenser can be reduced. If the difference (Ti−Ta) between the temperature (Ti) of the top product before heat exchange with water or the reboiler and the temperature (Ta) of the effluent stream of water or the reboiler after heat exchange with the top product is within the above-described range, it is not particularly limited, and may be, for example, 60° C. or lower, 50° C. or lower, 40° C. or lower, preferably 30° C. or lower, and the lower limit is not particularly limited. The temperature (Ti) of the top product before heat exchange with water or the reboiler is not particularly limited as long as it satisfies Equation 1 above, but it may be 110 to 160° C., for example, 110 to 150° C. The temperature (Ta) of the effluent stream of water or the reboiler after heat exchange with the top product is not particularly limited as long as it satisfies Equation 1 above, but it may be 90° C. to 140° C., for example, 95° C. to 135° C. or 100° C. to 130° C.

In one example, a difference (Ti−Tb) between the temperature (Ti) of the top product of the second distillation column before heat exchange with the reboiler of the first distillation column and the temperature (Tb) of the effluent stream of the reboiler after heat exchange with the top product of the second distillation column can be controlled so as to satisfy Equation 2 below.

$|Ti-Tb| \leq 25°$ C.  [Equation 2]

In the solvent recovery method, by controlling the difference (Ti−Tb) between the temperature (Ti) of the top product before heat exchange with the reboiler and the temperature (Tb) of the effluent stream of the reboiler after heat exchange with the top product of the second distillation column in the above range, the amount of steam used in reboiler can be reduced. In one example, if the difference (Ti−Tb) between the temperature (Ti) of the top product before heat exchange with the reboiler and the temperature (Tb) of the effluent stream of the reboiler after heat exchange with the top product of the second distillation column is within the above-described range, it is not particularly limited, and may be, for example, 25° C. or less, or 20° C., and the lower limit is not particularly limited. The temperature (Ti) of the top product before heat exchange with the reboiler is not particularly limited as long as it satisfies Equation 2 above, but it may be 130 to 160° C., for example, 130 to 150° C. The temperature (Tb) of the effluent stream of the reboiler after heat exchange with the top product of the second distillation column is not particularly limited as long as it satisfies Equation 2 above, but it may be 120° C. to 140° C., for example, 125° C. to 135° C.

In one example, the top operating temperature of the first distillation column may be in a range of 95 to 105° C., and the bottom operating temperature may be in a range of 125 to 140° C. In addition, the top operating temperature of the second distillation column may be in a range of 110 to 160° C., and the bottom operating temperature may be in a range of 120 to 165° C.

In one example, the operating pressure (P2) of the second distillation column (41) of the present application can be controlled to be higher than the operating pressure (P1) of the first distillation column (31). When the top product of the second distillation column and water are heat-exchanged, the operating pressure of the distillation column is not particularly limited, but when the top product of the second distillation column and the reboiler are heat-exchanged, the operating pressure (P2) of the second distillation column can be controlled to be higher than the operating pressure (P1) of the first distillation column. For example, a pressure difference (P2−P1) between the operating pressure (P2) of the second distillation column and the operating pressure (P1) of the first distillation column may be 0.6 to 2.5 barg, 0.6 to 2.2 barg, 0.6 to 1.9 barg, or 0.7 to 1.6 barg.

In one example, the operating pressure of the second distillation column may be 2.5 to 7.5 barg, 3.0 to 7.0 barg, 3.5 to 6.5 barg, or 4.0 to 6.0 barg. In addition, the operating pressure of the first distillation column may be 3.5 to 5.0 barg, 3.5 to 4.5 barg, and 3.5 to 4.0 barg.

In one example, the solvent recovery method of the present application may satisfy Equation 3 below.

$$0.6 \leq P2-P1 \leq 2.5 \text{ barg} \qquad \text{[Equation 3]}$$

In the above equation, P2 is a pressure of the second distillation column and P1 is a pressure of the first distillation column.

By controlling the pressures of the first distillation column (31) and the second distillation column (41) as above, the temperature of the top stream (401) discharged from the top of the second distillation column (41) and the temperature of the water effluent stream discharged from the heat exchanger (61) can be controlled as Equation 1, thereby effectively recovering the waste heat.

The waste heat recovery method according to another embodiment of the present application can heat-exchange the first bottom stream (302) discharged from the bottom region of the first distillation column (32) and at least a part of the top stream (402) discharged from the top region of the second distillation column (42) in the first reboiler (312), and can heat-exchange at least a part of the water supply stream (122) and the remaining part (452) of the top stream (402) discharged from the top region of the second distillation column (42). The first bottom stream (302) is heated in the first reboiler using a part (442) of the top stream (402) and supplied to the first distillation column (32), whereby the energy to be used in heating the bottom stream can be reduced.

In one example, the top stream (402) discharged from the top region of the second distillation column (42) heat-exchanged with the first top stream (302) discharged from the bottom region of the first distillation column (32) in the first reboiler (312) may be supplied between the condenser (52) and the heat exchanger (62).

In one example, a difference (Ta−Ti) between the temperature (Ti) of the top product before heat exchange with water and the reboiler and the temperature (Ta) of the effluent stream of water and the reboiler after heat exchange with the top product can be controlled to satisfy Equation 1 below.

$$|Ti-Ta| \leq 60° \text{ C.} \qquad \text{[Equation 1]}$$

By controlling the difference (Ti−Ta) between the temperature (Ti) of the top product before heat exchange with water and the reboiler and the temperature (Ta−Ta) of the effluent stream of water and reboiler after heat exchange with the top product in the above range, the amount of cooling water used in the condenser can be reduced. If the difference (Ti−Ta) between the temperature (Ti) of the top product before heat exchange with water and the reboiler and the temperature (Ta−Ta) of the effluent stream of water and the reboiler after heat exchange with the top product is within the above-described range, it is not particularly limited, and may be, for example, 60° C. or lower, 50° C. or lower, 40° C. or lower, preferably 30° C. or lower, and the lower limit is not particularly limited. The temperature (Ti) of the top product before heat exchange with water and the reboiler is not particularly limited as long as it satisfies Equation 1 above, but it may be 130° C. to 160° C., for example, 130° C. to 140° C. In addition, the temperature (Ta) of the effluent stream of water and the reboiler after heat exchange with the top product is not particularly limited as long as it satisfies Equation 1 above, but it may be 90° C. to 140° C., 95° C. to 135° C., 100° C. to 130° C., or 101° C. to 127° C.

In one example, a difference (Ti−Tb) between the temperature (Ti) of the top product of the second distillation column before heat exchange with the reboiler of the first distillation column and water and the temperature (Tb) of the effluent stream of the reboiler after heat exchange with the top product of the second distillation column can be controlled to satisfy Equation 2 below.

$$|Ti-Tb| \leq 25° \text{ C.} \qquad \text{[Equation 2]}$$

By controlling the difference (Ti−Tb) between the temperature (Ti) of the top product before heat exchange with water and the reboiler and the temperature (Tb) of the effluent stream of the reboiler after heat exchange with the top product of the second distillation column in the above range, the amount of cooling water used in the condenser can be reduced and the amount of steam used in the reboiler can be reduced. In one example, if the difference (Ti−Tb) between the temperature (Ti) of the top product before heat exchange with the reboiler and the temperature (Tb) of the effluent stream of the reboiler after heat exchange with the top product of the second distillation column is within the above-described range, it is not particularly limited, and may be, for example, 25° C. or lower, or 20° or lower. The temperature (Ti) of the top product before heat exchange with water or the reboiler is not particularly limited as long as it satisfies Equation 2 above, but it may be 130° C. to 160° C., for example, 130° C. to 150° C. The temperature (Tb) of the effluent stream of the reboiler after heat exchange with the top product of the second distillation column is not particularly limited as long as it satisfies Equation 2 above, but it may be 120° C. to 160° C., for example, 125° C. to 150° C.

In one example, the top operating temperature of the first distillation column may be in a range of 95 to 105° C., and the bottom operating temperature may be in a range of 125 to 140° C. In addition, the top operating temperature of the second distillation column may be in a range of 130 to 160° C., and the bottom operating temperature may be in a range of 140 to 165° C.

In the above example, the operating pressure (P2) of the second distillation column (41) of the present application can be controlled to be higher than the operating pressure (P1) of the first distillation column (31). For example, the pressure difference between the operating pressure (P2) of the second distillation column and the operating pressure (P1) of the first distillation column may be 0.6 to 2.5 barg, 0.6 to 2.2 barg, 0.6 to 1.9 barg, or 0.7 to 1.6 barg.

In one example, the operating pressure of the second distillation column may be 4.0 to 7.5 barg, 4.1 to 7.0 barg, 4.1 to 6.5 barg, or 4.2 to 6.0 barg. In addition, the operating pressure of the first distillation column may be 3.0 to 5.0 barg, 3.2 to 4.5 barg, or 3.5 to 4.0 barg.

In the above example, the solvent recovery method of the present application may satisfy Equation 3 below.

$$0.6 \leq P2-P1 \leq 2.5 \text{ barg} \qquad \text{[Equation 3]}$$

In the above equation, P2 is a pressure of the second distillation column and P1 is a pressure of the first distillation column.

By controlling the pressures of the first distillation column (32) and the second distillation column (42) as above, the temperature of the top stream (402) discharged from the top of the second distillation column (42) and the temperature of the water effluent stream (602) discharged from the heat exchanger (62) can be controlled as Equation 1, thereby effectively recovering the waste heat.

In one example, a ratio of the flow rate (A) of the top product of the second distillation column to be heat-exchanged with water to the flow rate (B) of the top product of the second distillation column to be heat-exchanged with the reboiler of the first distillation column may be 0.40 to 0.65.

Advantageous Effects

According to the present application, the waste heat is recovered from the upper condenser of the distillation column and supplied to the heat source of the stripping unit, whereby the energy can be significantly reduced as compared to the conventional synthetic rubber production process.

BRIEF DESCRIPTION OF DRAWINGS

FIG. 1 is a configuration diagram for explaining a solvent recovery process performed upon the conventional production of synthetic rubber.

FIG. 2 is a configuration diagram of a synthetic rubber production process to which the process waste heat recovery method according to a first embodiment of the present application is applied.

FIG. 3 is a configuration diagram of a synthetic rubber production process to which the process waste heat recovery method according to a second embodiment of the present application is applied.

BEST MODE

Hereinafter, the present application will be described in more detail by way of examples according to the present application and comparative examples that do not comply with the present application, but the scope of the present application is not limited by the following examples.

Example 1

As illustrated in FIG. 2, the water supplied from the water supply tank (10) through the water supply line (121) and the steam supplied through the steam supply line (131) were mixed in the steam mixer (71) and supplied to the stripping unit (22). In the stripping unit (22), the solvent separated from the polymer was recovered and introduced into the first distillation column (31) through the solvent inflow line (201). The first bottom stream (301) discharged from the bottom region of the first distillation column (31) was reheated through the first reboiler (311) and refluxed to the first distillation column (31). The solvent discharged from the first distillation column (31) was introduced into the second distillation column (41) through the first outflow line (321). The second bottom stream (421) discharged from the bottom region of the second distillation column (41) was heated in the second reboiler (411) and refluxed to the second distillation column (41).

A part (611) of the water supply stream (121) was heat-exchanged with the top stream (401) discharged from the top region of the second distillation column (41) in the heat exchanger (61), and then supplied to the water supply line (121) through the water outflow line (601). The temperature of the top stream (401) discharged from the top region of the second distillation column was 114° C. and the temperature of the water effluent stream (601) after heat exchange in the top stream (401) was subjected to be 109° C. The operating pressure of the first distillation column was 3.8 barg, and the operating pressure of the second distillation column was subjected to be 2.5 barg.

Example 2

As illustrated in FIG. 3, the same apparatus as in Example 1 was used, except that a part (612) of the water supply stream (122) was heat-exchanged with a part (452) of the top stream (402) discharged from the top region of the second distillation column (42) in the heat exchanger (62) and then supplied to the water supply line (122) through the water outflow line (602), a part (442) of the top stream (402) was introduced into the first reboiler (312) and heat-exchanged with the first bottom stream (302) of the first distillation column (32).

The temperature of the top stream (402) discharged from the top region of the second distillation column was 132° C. and the temperature of the water effluent stream (602) heat-exchanged in and discharged from the heat exchanger (62) was subjected to be 101° C. The temperature of the effluent stream (332) discharged from the first reboiler (312) after heat exchange with a part (442) of the top stream (402) was subjected to be 127° C. The ratio of the part (452) of the top stream (402) heat-exchanged with the heat exchanger (62) and the part (442) of the top stream (402) heat-exchanged with the first reboiler (312) was subjected to be 0.55. The operating pressure of the first distillation column was 3.5 barg and the operating pressure of the second distillation column was subjected to be 4.2 barg.

Comparative Example

As illustrated in FIG. 1, the same apparatus as in Example 1 was used, except that the top stream (400) discharged from the top region of the second distillation column (40) was condensed through the condenser (55) and then introduced into the first distillation column (30) or the second distillation column (40), and the waste heat from the cooling water supplied to the condenser (50) was discarded.

TABLE 1

| | Comparative Example | Example 1 | Example 2 |
|---|---|---|---|
| Upper temperature of first distillation column | 100° C. | 100° C. | 99° C. |
| Lower temperature of first distillation column | 130° C. | 130° C. | 127° C. |
| Upper temperature of second distillation column | 74° C. | 114° C. | 132° C. |
| Lower temperature of second distillation column | 84° C. | 123° C. | 143° C. |
| Ti—Ta | — | 5° C. | 31° C. |
| Ti—Tb | — | — | 5° C. |
| P2 - P1 | — | — | 0.7 |

Table 1 is a table comparing the operating conditions of Examples and Comparative Example.

TABLE 2

| Used Amount of Steam (Kg/hr) | Comparative Example (Conventional) | Example 1 | Example 2 |
|---|---|---|---|
| First distillation column | 2,752 | 2,752 | 0 |
| Second distillation column | 3,648 | 5,694 | 6,708 |
| Stripping unit supply | 5,500 | 0 | 1,817 |
| Total used amount | 11,900 | 8,446 | 8,524 |
| Reduction amount | — | 3,454 | 3,376 |
| Reduction ratio (%) | | 29.0 | 28.4 |

As shown in Table 2, when the synthetic rubber is produced using the solvent recovery apparatus and the solvent recovery method of the present application, the used amount of steam of at most 3,454 Kg/hr can be reduced and it can be confirmed that the reduction ratio of 28.4% or 29.0% is represented as compared to Comparative Example.

The invention claimed is:

1. A solvent recovery apparatus comprising a solvent separation part comprising a water supply tank and a stripping unit capable of separating, from a mixture comprising a polymer component and a solvent, said polymer component and said solvent; a purification part capable of purifying the solvent recovered in said solvent separation part, which comprises a first distillation column and a second distillation column connected to each other and each having a reboiler and a condenser; and a piping system, wherein said piping system comprises a first line formed so that water from said water supply tank can be mixed with said mixture and then introduced into said stripping unit; a second line formed so that the solvent recovered from said solvent separation part can be introduced into said first distillation column; and a third line formed so that the solvent purified in said first distillation column can be introduced into said second distillation column, and said piping system further comprises a first heat exchange line or a second heat exchange line;

wherein the first heat exchange line is provided with a heat exchanger in fluid communication with the condenser of the second distillation column, and said heat exchanger and said condenser of the second distillation column are installed in said first heat exchange line such that a top product of the second distillation column can be heat exchanged with water in said heat exchanger and then introduced into said condenser of the second distillation column; and wherein the second heat exchange line is provided in heat communication with the reboiler of the first distillation column and in fluid communication with the condenser of the second distillation column, and said reboiler of the first distillation column and said condenser of the second distillation column are installed in said second heat exchange line such that the top product of the second distillation column can pass through said reboiler of the distillation column and then pass through said condenser of the second distillation column.

2. The solvent recovery apparatus according to claim 1, further comprising a steam supply line installed so that steam can be supplied to the first line.

3. The solvent recovery apparatus according to claim 1, wherein the piping system comprises first and second heat exchange lines, and said first and second heat exchange lines are formed such that a part of the top product of the second distillation column can be heat-exchanged with water of the solvent recovery part and then refluxed to the second distillation column through the condenser of the second distillation column, and the other part of the top product of the second distillation column can pass through the reboiler of the first distillation column and the condenser of the second distillation column sequentially and then be refluxed to the second distillation column.

4. A solvent recovery method using the solvent recovery apparatus of claim 1,
comprising a solvent recovery step comprising a process of mixing a mixture comprising a polymer component and a solvent with water from a water supply tank and then introducing the mixture into the stripping unit; and
a solvent purification step of purifying the solvent recovered in the solvent recovery step in the first and second distillation columns,
but performing a step of heat-exchanging the top product of said second distillation column with water before being mixed with said mixture or of introducing a part of the top product of said second distillation column into the reboiler of said first distillation column through the piping system.

5. The solvent recovery method according to claim 4, wherein the temperature (Ti) of the top product before heat exchange with water or the reboiler and the temperature (Ta) of the effluent stream of water or the reboiler after heat exchange with the top product are controlled so as to satisfy Equation 1 below:

$$|Ti-Ta| \leq 60° C \qquad \text{[Equation 1]}.$$

6. The solvent recovery method according to claim 5, wherein the temperature (Ti) of the top product before heat exchange with water or the reboiler is in a range of 110 to 160° C.

7. The solvent recovery method according to claim 5, wherein the temperature (Ta) of the effluent stream of water or the reboiler after heat exchange with the top product is in a range of 90 to 140° C.

8. The solvent recovery method according to claim 4, wherein a difference (Ti–Tb) between the temperature (Ti) of the top product of the second distillation column before being introduced into the reboiler of the first distillation column and the temperature (Tb) of the effluent stream of said reboiler after heat exchange with the top product of the second distillation column is controlled so as to satisfy Equation 2 below:

$$|Ti-Tb| \leq 25° C \qquad \text{[Equation 2]}.$$

9. The solvent recovery method according to claim 8, wherein the temperature (Ti) of the top product of the second distillation column before being introduced into the reboiler of the first distillation column is in a range of 130 to 160° C.

10. The solvent recovery method according to claim 8, wherein the pressures of the first distillation column and the second distillation column satisfy Equation 3 below:

$$0.6 \leq P2-P1 \leq 2.5 \text{ barg,}$$

$$3.5 \leq P1 \leq 5.0 \text{ barg} \qquad \text{[Equation 3]}$$

where P2 is a pressure of the second distillation column and P1 is a pressure of the first distillation column.

11. The solvent recovery method according to claim 4, performing a step of heat-exchanging a part of the top product of said second distillation column with water before being mixed with said mixture and heat-exchanging the other part of the top product of said second distillation column with the reboiler of said first distillation column.

12. The solvent recovery method according to claim 10, wherein the ratio of the flow rate (A) of the top product of the second distillation column heat-exchanged with water to the flow rate (B) of the top product of the second distillation column heat-exchanged with the reboiler of the first distillation column is 0.40 to 0.65.

13. The solvent recovery method according to claim 4, wherein the top operating temperature of the first distillation column is in a range of 95 to 105° C. and the bottom operating temperature is in a range of 125 to 140° C.

14. The solvent recovery method according to claim 4, wherein the top operating temperature of the second distillation column is in a range of 110 to 160° C. and the bottom operating temperature is in a range of 120 to 165° C.

* * * * *